US012120489B2

(12) United States Patent
Kamimura et al.

(10) Patent No.: US 12,120,489 B2
(45) Date of Patent: Oct. 15, 2024

(54) EAR MOUNT

(71) Applicant: JVCKENWOOD Corporation, Yokohama (JP)

(72) Inventors: Shinji Kamimura, Yokohama (JP); Miharu Kobayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 176 days.

(21) Appl. No.: 17/974,842

(22) Filed: Oct. 27, 2022

(65) Prior Publication Data

US 2023/0133906 A1 May 4, 2023

(30) Foreign Application Priority Data

Oct. 29, 2021 (JP) ................................ 2021-177786
Oct. 29, 2021 (JP) ................................ 2021-177874
Oct. 29, 2021 (JP) ................................ 2021-177894

(51) Int. Cl.
*H04R 25/00* (2006.01)

(52) U.S. Cl.
CPC ........ *H04R 25/658* (2013.01); *H04R 2460/11* (2013.01)

(58) Field of Classification Search
CPC ............. H04R 25/658; H04R 2460/11; H04R 25/656; H04R 1/1016; H04R 1/1058;
(Continued)

(56) References Cited

U.S. PATENT DOCUMENTS

2010/0111348 A1* 5/2010 Tsao .................... H04R 1/1016 381/380
2013/0259286 A1* 10/2013 Chung ................ H04R 1/1016 381/380
(Continued)

FOREIGN PATENT DOCUMENTS

EP 3902284 A1 10/2021
JP 2014-057164 A 3/2014
(Continued)

OTHER PUBLICATIONS

Search Report issued on Mar. 23, 2023 in the counterpart European application No. 22201452.4.

*Primary Examiner* — Angelica M McKinney
(74) *Attorney, Agent, or Firm* — Nath, Goldberg & Meyer; Jerald L. Meyer

(57) ABSTRACT

An ear mount includes a body part mounted on a conchal cavity and an insertion part mounted on a cylindrical part and inserted into an ear canal. A cover configured to cover an inner housing of the body part with a protrusion formed thereon includes: a first end sealed and fixed to the inner housing; an intermediate part separated from the inner housing to form an air chamber between the intermediate part and the inner housing, and configured to cover the protrusion; a second end located opposite to the first end with the intermediate part therebetween; and an opening located at the second end and through which the cylindrical part is inserted. The ear mount includes a pressure regulator for controlling ventilation of air between the air chamber and an outer space through the opening in accordance with a pressure difference between the air chamber and the outer space.

7 Claims, 10 Drawing Sheets

(58) Field of Classification Search
CPC ............ H04R 2201/105; H04R 1/1075; H04R 1/1066; H04R 1/1041; A61H 9/005; B29C 43/52
See application file for complete search history.

(56) References Cited

U.S. PATENT DOCUMENTS

| | | | | |
|---|---|---|---|---|
| 2016/0073193 | A1* | 3/2016 | Kirkpatrick | B29C 43/52 381/328 |
| 2016/0151206 | A1* | 6/2016 | George | A61H 9/005 128/866 |
| 2020/0059715 | A1* | 2/2020 | Hsiao | H04R 1/1041 |
| 2022/0103928 | A1* | 3/2022 | Staerke | H04R 1/1066 |
| 2024/0031727 | A1* | 1/2024 | Park | H04R 1/1075 |

FOREIGN PATENT DOCUMENTS

| | | | | | |
|---|---|---|---|---|---|
| KR | 20100108733 | A | * | 10/2010 | H04R 1/1016 |
| KR | 20170098527 | A | * | 8/2017 | H04R 1/1016 |
| WO | WO-2020153666 | A1 | * | 7/2020 | H04R 1/1016 |

* cited by examiner

EAR MOUNT

CROSS REFERENCE TO RELATED APPLICATION

The present application is based on, and claims priority from the prior Japanese Patent Application Nos. 2021-177786, 2021-177874, and 2021-177894, all filed on Oct. 29, 2021, the entire contents of which are incorporated herein by reference.

BACKGROUND

The present disclosure relates to an ear mount.

Japanese Unexamined Patent Application Publication No. 2014-057164 discloses an ear mount such as an earplug, an earphone, or a hearing aid. In this ear mount, an insertion part inserted into the ear canal has a soundproof member and an elastic member covering the soundproof member. The elastic member is expanded by causing air to flow into the inside of the elastic member and thus the elastic member is in close contact with the inner wall of the ear canal. Accordingly, the wearing sensation is improved.

SUMMARY

An ear mount generally has an insertion part that is inserted into the ear canal and a body part that is fitted into the conchal cavity of the auricle. The ear mount disclosed in Japanese Unexamined Patent Application Publication No. 2014-057164 improves the wearing sensation of the insertion part inserted into the ear canal, but does not improve the wearing sensation of the body part fitted into the conchal cavity.

An ear mount in accordance with some embodiments includes: a body part mounted on a conchal cavity in a use state and including a protrusion, a cylindrical part extending from the protrusion, an inner housing on which the protrusion is formed, and a cover configured to cover the inner housing; and an insertion part mounted on the cylindrical part and inserted into an ear canal in the use state. The cover includes a first end sealed and fixed to the inner housing, an intermediate part separated from the inner housing to form an air chamber between the intermediate part and the inner housing and configured to cover the protrusion, a second end located opposite to the first end with the intermediate part therebetween, and an opening located at the second end and through which the cylindrical part is inserted. The ear mount includes a pressure regulator configured to control ventilation of air between the air chamber and an outer space through the opening in accordance with a pressure difference between the air chamber and the outer space.

DETAILED DESCRIPTION

An ear mount according to embodiments of the present invention will be described below with reference to the drawings.

Embodiment 1

Figure 1:
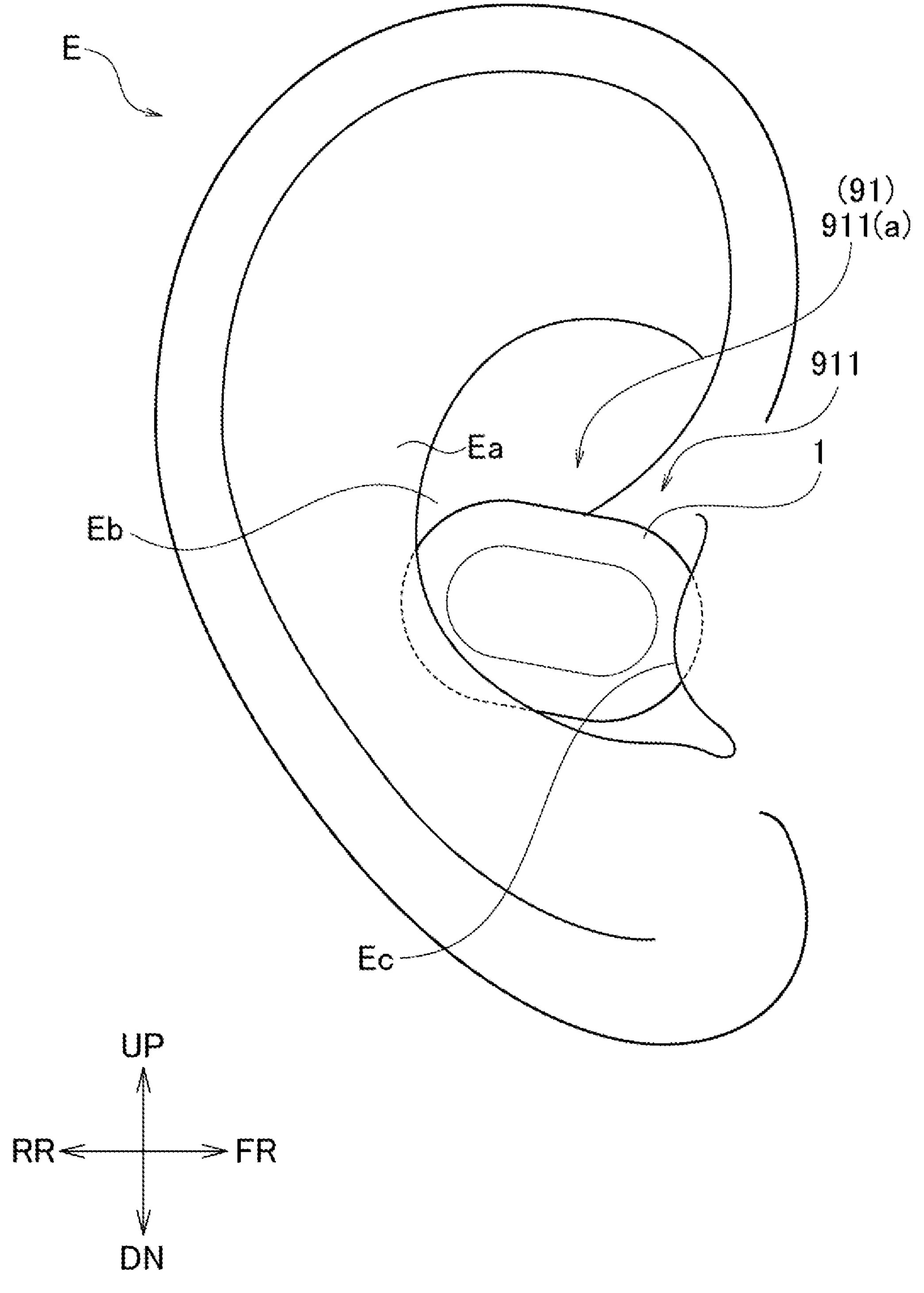
FIG. 1 illustrates a state in which an earplug of an ear mount according to Embodiment 1 is mounted on a right auricle.
Figure 2:
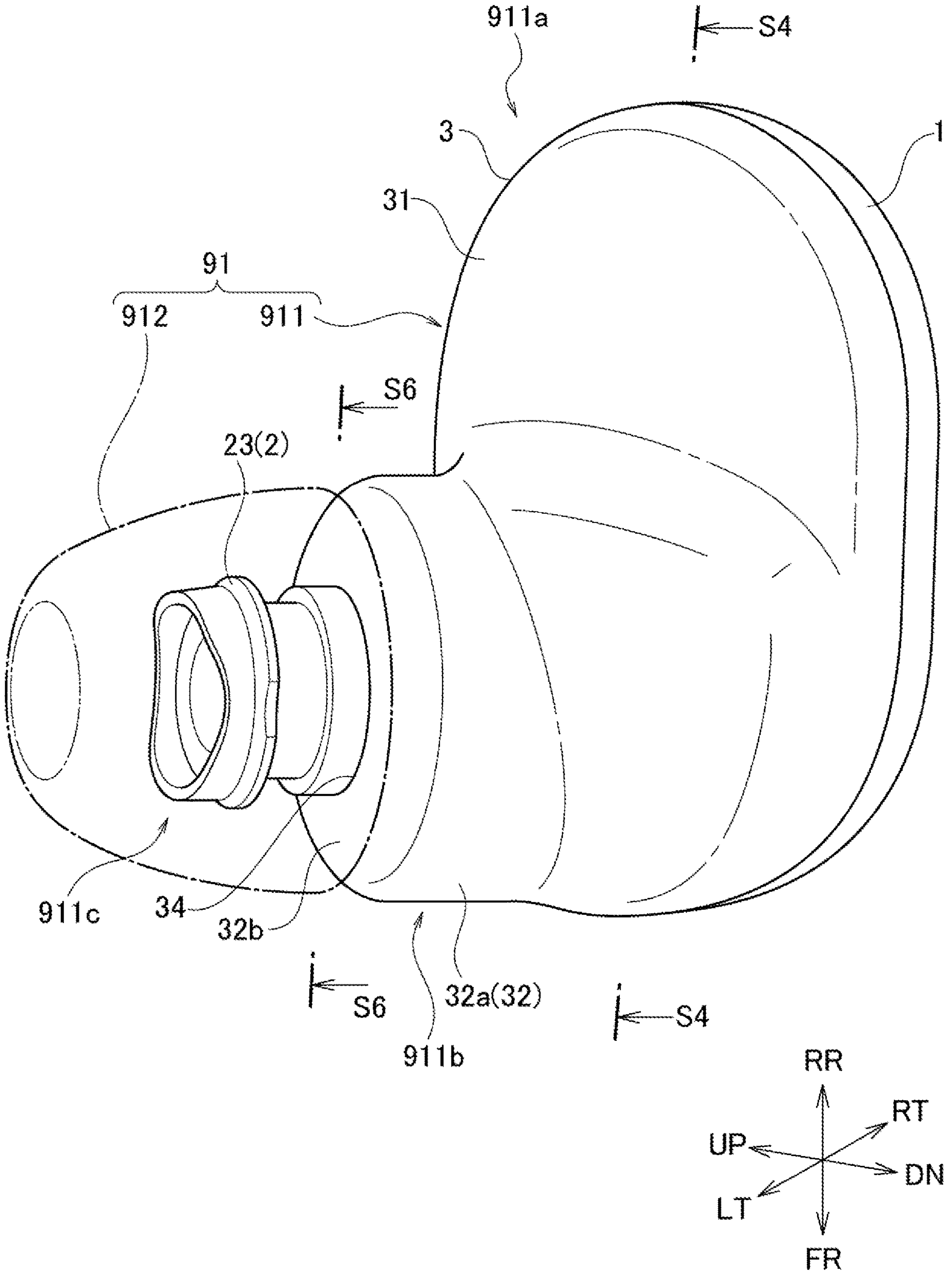
FIG. 2 is a perspective view of an earplug according to Embodiment 1.

An outline of an earplug 91 according to Embodiment 1 will be described with reference to FIGS. 1 and 2. The earplug 91 described below is for the right ear, and earplugs for the right ear and the left ear have a left/right symmetrical shape. For convenience of explanation, the front, rear, up, down, left, and right directions are defined as the directions of the arrows illustrated in FIGS. 1 and 2. The up-down direction is the vertical direction when the wearer of the earplug 91 is in the standing position. The front-rear direction corresponds to the front-rear direction of the head. The left-right direction corresponds to the left-right direction of the head. In FIGS. 1, 2, 4 and 5, the front, rear, up, down, right, and left directions are denoted by FR, RR, UP, DN, RT, and LT, respectively.

While being mounted on an auricle E, the earplug 91 has a body part 911 that is fitted in a conchal cavity Eb and an insertion part 912 that protrudes from the body part 911 and is inserted into an ear canal. The insertion part 912 is formed of silicone rubber or the like and has elasticity. The insertion part 912 is detachably attached to the body part 911. The state in which the earplug 91 is mounted on the auricle E is also referred to as a use state.

As illustrated in FIG. 2, the body part 911 has a base 911*a*, a protrusion 911*b*, and a locking protrusion 911*c*. The base 911*a* has an ellipsoidal shape obtained by forming an oval into a flatted solid shape. The protrusion 911*b* protrudes toward the left and obliquely upward and is formed at a position biased to the front of the surface facing the conchal cavity Eb when the earplug is mounted on the auricle E. The locking protrusion 911*c* protrudes from the end side of the protrusion 911*b* in the protrusion direction along the axial direction of the protrusion 911*b* and has a smaller diameter than the protrusion 911*b*. The insertion part 912 is elastically locked to the locking protrusion 911*c*.

With the earplug 91 illustrated in FIG. 1 mounted on the auricle E, the insertion part 912 is inserted into the ear canal and the base 911*a* of the body part 911 is fitted in the conchal cavity Eb. The front side of the base 911*a* enters between the conchal cavity Eb and a tragus Ec so as to be sandwiched therebetween, and the rear side of the base 911*a* enters the inner side of an anthelix Ea, which projects to cover the conchal cavity Eb. Accordingly, the earplug 91 is stably mounted on the auricle E as long as no excessive external force in the direction of separation is applied.

Figure 3:
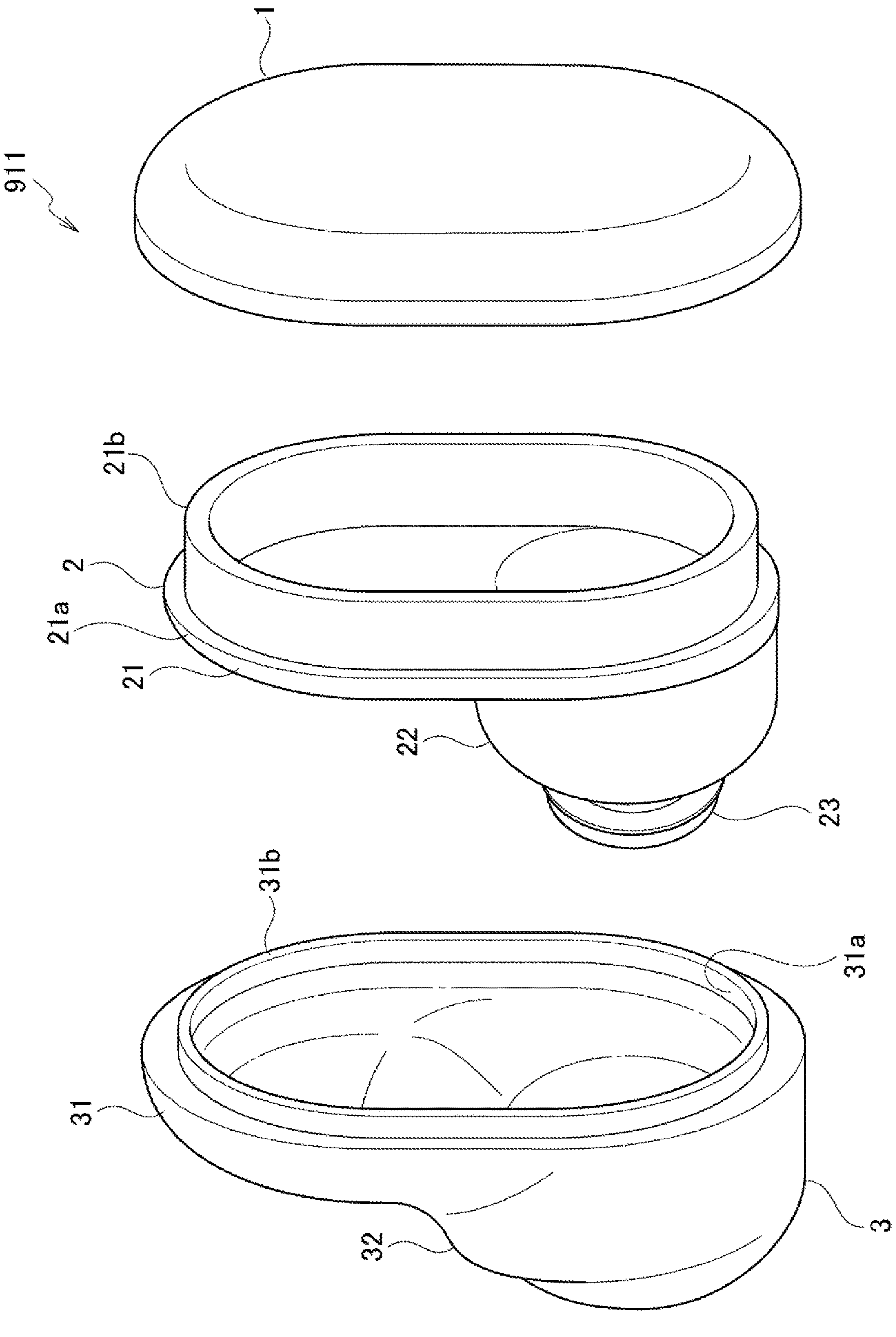
FIG. 3 is an assembly view of a body part of an earplug according to Embodiment 1.

The body part 911 includes an outer housing 1, an inner housing 2, and a cover 3 as illustrated in FIG. 3. The outer housing 1 and the inner housing 2 are formed of a hard resin. The hard resin is a polycarbonate (PC), for example. The cover 3 is formed of a flexible material. Examples of such a material include elastomers, silicone rubber, and the like.

Figure 4:
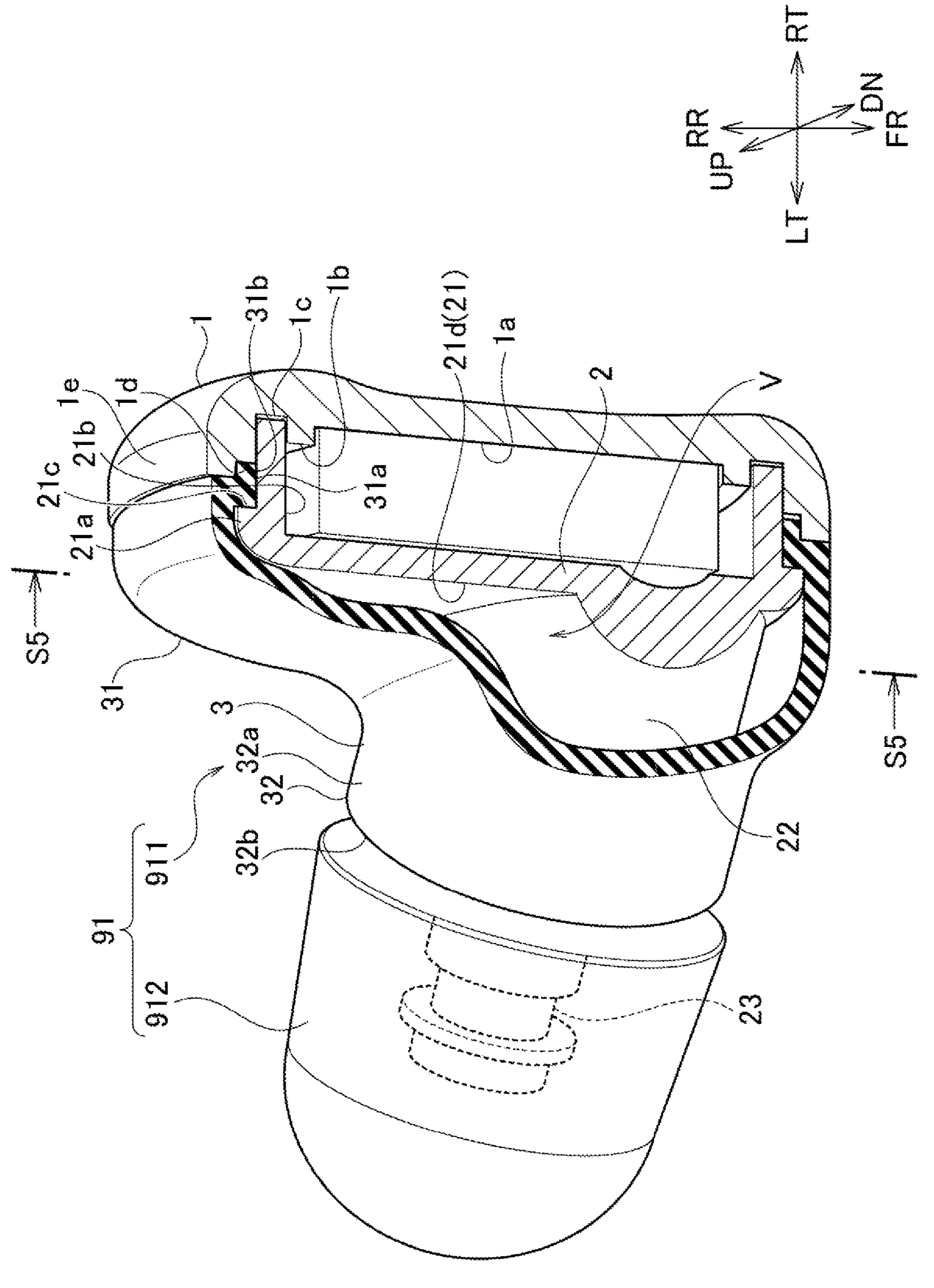
FIG. 4 is a partial cross-sectional view of a body part along line S4-S4 of FIG. 2.

FIG. 4 is a partial cross-sectional view of the body part 911 along line S4-S4 of FIG. 2. As illustrated in FIG. 4, the outer housing 1 has a nearly flat bottom wall 1*a* and an outer peripheral wall 1*e* that is raised and curved from the entire outer edge of the bottom wall 1*a*. The outer peripheral wall 1*e* has a circumferential step part 1*d* which is hollowed out along the whole circumference of the outer peripheral wall 1*e* toward the right, at the inner edge of the left tip surface of the outer peripheral wall 1*e*. At a position on the bottom wall 1*a*, which is separated from the outer peripheral wall 1*e* and inside of the outer peripheral wall 1*e*, an inner rib 1*b* protruding to the left at a height lower than the outer peripheral wall 1*e* is formed along the entire outer edge of the bottom wall 1*a*.

As illustrated in FIGS. 3 and 4, the inner housing 2 has a base 21*d* and an engagement projection 21*b*. The base 21*d* faces the bottom wall 1*a* of the outer housing 1. The engagement projection 21*b* protrudes toward the right near the peripheral edge of the base 21*d* along the whole circumference of the base 21*d*. The peripheral edge of the base 21*d* forms an outer flange 21*a* protruding more outward than the engagement projection 21*b*. At a position biased to the front of the base 21*d*, a cylindrical protrusion 22 is formed which protrudes to the left and obliquely upward. From the tip surface of the protrusion 22, a cylindrical part 23 with a smaller diameter than the protrusion 22 extends along the axis of the protrusion 22. The above described locking protrusion 911*c* visible as part of the external appearance is this cylindrical part 23.

As illustrated in FIG. 4, the outer housing 1 and the inner housing 2 can be combined by entering the engagement projection 21*b* of the inner housing 2 into a circumferential recess 1*c* for the engagement projection 21*b* to engage with the circumferential recess 1*c*. The circumferential recess 1*c* is a recess between the outer peripheral wall 1*e* of the outer housing 1 and the inner rib 1*b*. While the outer housing 1 and the inner housing 2 are combined, the circumferential step part 1*d* of the outer housing 1 and the circumferential step part 21*c* of the inner housing 2 face each other in the left-right direction with a gap therebetween.

As illustrated in FIGS. 3 and 4, the cover 3 has a cover base 31 as an intermediate part in the left-right direction and a cylindrical protrusion 32. The cover base 31 has the same outer shape as the outer housing 1. The cylindrical protrusion 32 has a bottomed cylindrical shape protruding toward the left and obliquely upward from a position biased to the front of the cover base 31. An opening 34 is formed in a shoulder 32*b*, which serves as a wall to cover the end of the cylinder of the cylindrical protrusion 32. The inner diameter of the opening 34 is larger than the outer diameter of the cylindrical part 23 of the inner housing 2.

The cover base 31, as illustrated in FIG. 4, has an inner flange 31*a* protruding inward along the whole circumference at the peripheral edge of the cover base 31, and a circumferential rib 31*b* that protrudes along the whole circumference of the inner flange 31*a* to the right from the inner edge of the inner flange 31*a*. The circumferential rib 31*b* is a first end on the right side in the left-right direction. The cylindrical protrusion 32 is a second end opposite to the first end with the intermediate part (the cover base 31) therebetween. The circumferential rib 31*b* fits in the gap formed between the circumferential step part 1*d* and the circumferential step part 21*c* when the outer housing 1 and the inner housing 2 are combined. The outer housing 1 and the inner housing 2 can be closely combined with the cover base 31 therebetween.

The body part 911 of the earplug 91 is formed by combining and integrating, by means of welding or bonding, the outer housing 1 and the inner housing 2 with the circumferential rib 31*b* of the cover base 31 therebetween. In other words, the circumferential rib 31*b* is sealed and fixed by being fitted in the gap formed between the circumferential step part 1*d* on the inner housing 2 side and the circumferential step part 21*c* of the inner housing 2. In the body part 911 obtained by integrating the outer housing 1 and the inner housing 2 with the cover 3 interposed therebetween, the cylindrical part 23 of the inner housing 2 is inserted into the opening 34 of the cover 3 in a natural state in which no external force is applied. In the natural state, the cover base 31 of the cover 3 is separated to the left from the base 21*d* of the inner housing 2. That is, an air chamber V as a space is formed between the cover base 31 and the base 21*d* in the natural state.

Figure 5:
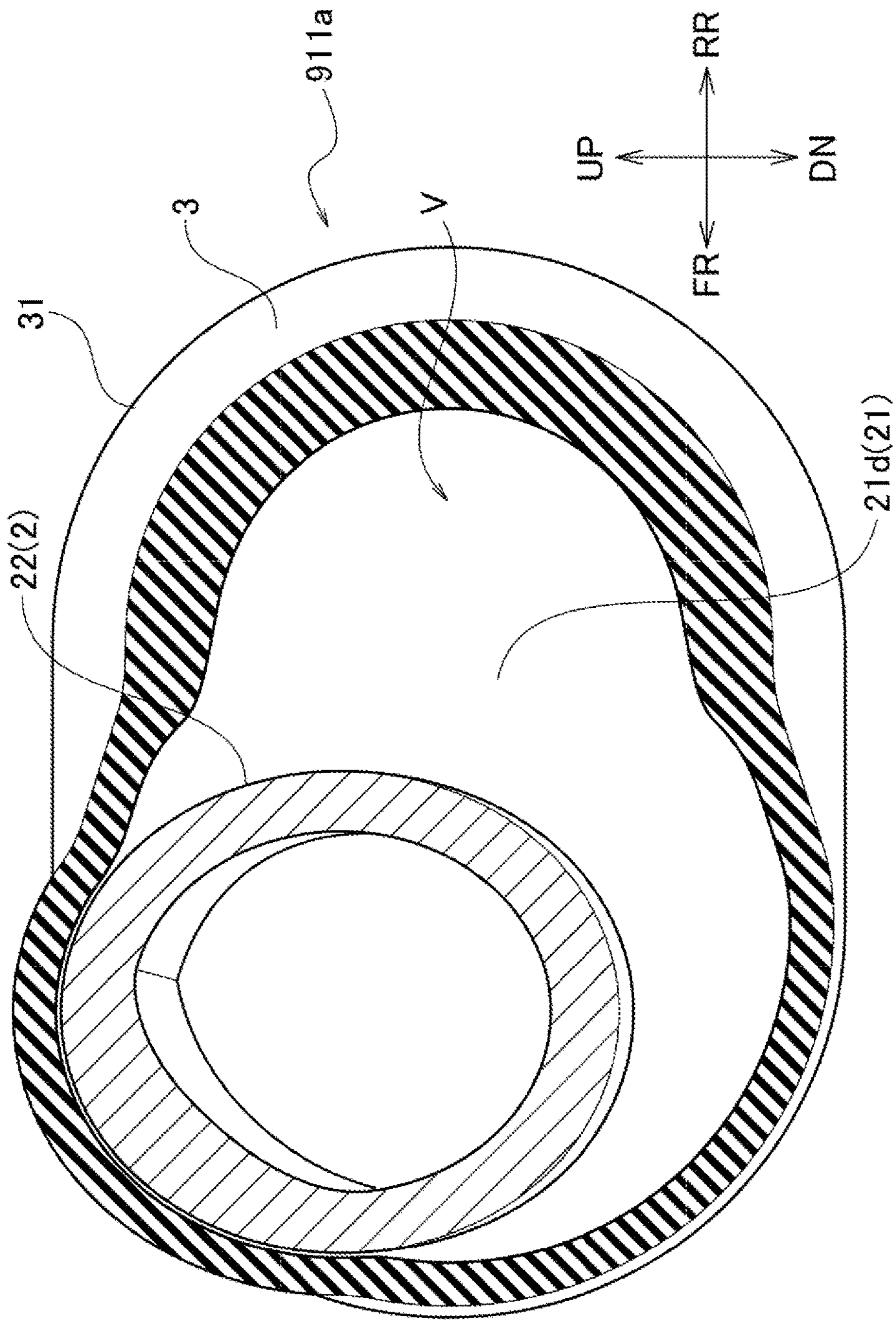
FIG. 5 is a cross-sectional view along line S5-S5 in FIG. 4.

FIG. 5 illustrates the formation range of the air chamber V, for example. FIG. 5 is a cross-sectional view along line S5-S5 of FIG. 4 as viewed from the left side at a position slightly to the left from the base 21*d* of the inner housing 2. As illustrated in FIG. 5, the air chamber V is formed in a wide area corresponding to the external shape of the base 911*a*. The cover 3 is formed of a material with a certain degree of flexibility, and the shape of the air chamber V is well maintained in the natural state.

The air chamber V extends to the left along the protrusion 22 of the inner housing 2 as illustrated in FIG. 4. The cover 3 is in close contact with the protrusion 22 at a position close to the tip of the protrusion 22 in the natural states. That is, the left-hand edge position of the air chamber V in the natural state is a boundary position at which the cover 3 is in close contact with the protrusion 22 at a position close to the tip of the protrusion 22. The inner flange 31*a* side of the cover base 31 of the cover 3, which is the right-hand edge side, is interposed and sealed between the inner housing 2 and the outer housing 1.

The tip side portion of the cylindrical protrusion 32 including the opening 34 in the cover 3 and the inner housing 2 work together to form a valve structure (a pressure regulator) BK that controls the entry and exit of the air between the interior of the air chamber V and an outer space. That is, the earplug 91 has the air chamber V and the valve structure BK that control the entry and exit of air in/from the air chamber V.

Figure 6A:
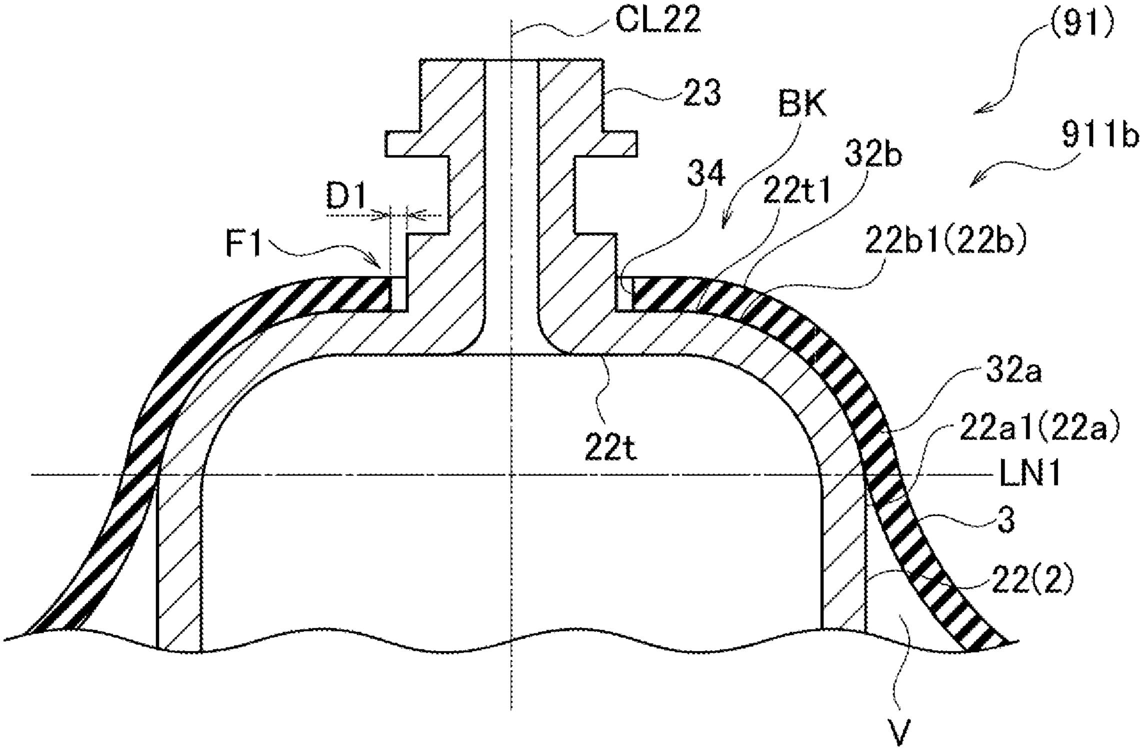
FIG. 6A is a cross-sectional view along line S6-S6 in FIG. 2, and is a longitudinal cross-sectional view of when an earplug is normally mounted on an auricle.

The valve structure BK is described with reference to FIG. 6A. FIG. 6A is a longitudinal cross-sectional view of the protrusion 911*b* of the body part 911, and specifically is a cross-sectional view along line S6-S6 in FIG. 2.

The protrusion 22 of the inner housing 2 has a cylindrical part 22*a* extending in a cylindrical shape with an axis CL22 as the axis, a top wall 22*t* which is substantially perpendicular to the axis CL22 and substantially covers the cylinder, and a shoulder 22*b* curving and smoothly connecting the tip of the cylindrical part 22*a* and the edge of the top wall 22*t*. In the natural state of the earplug 91, the cover 3 is mounted such that an outer surface 22*t*1 of the top wall 22*t* and the tip side portion of an outer surface 22*b*1 of the shoulder 22*b* (a portion closer to the tip side than a close contact boundary line LN1 in FIG. 6A) are in close contact with the protrusion 22 of the inner housing 2. The close contact boundary line LN1 is a line indicating the position at which the cover 3 begins to contact the protrusion 22.

Specifically, the inner surface of the cylindrical protrusion 32 of the cover 3 is formed in the same shape as the outer surface of the protrusion 22 of the inner housing 2 on the side closer to the tip than the close contact boundary line LN1. A side part 32*a* of the cylindrical protrusion 32 is in close contact with the cylindrical part of the protrusion 22 with the close contact boundary line LN1 as a boundary. The shoulder 32*b* of the cylindrical protrusion 32 is in close contact with the shoulder 22*b* of the protrusion 22. Accordingly, in the earplug 91, the valve structure BK is closed in the natural state, the air chamber V is sealed, and no internal air is leaked to the outside.

The opening 34 of the cover 3 is coaxial with the cylindrical part 23 of the inner housing 2 and is formed to have an inner diameter larger than the outer diameter of the cylindrical part 23. Therefore, a gap F1 of a distance D1 in the radial direction is formed between the base part of the cylindrical part 23 and the end face of the opening 34.

When the earplug 91 having the valve structure BK is mounted on the auricle E, the user grips the body part 911 with the fingers and presses the body part 911 to fit into the conchal cavity Eb while inserting the insertion part 912 into the ear canal. When the body part 911 is pressed against the conchal cavity Eb, the cover base 31 of the cover 3 is pressed against the surface of the conchal cavity Eb and is elastically deformed such that the distance between the cover base 31 and the base 21*d* of the inner housing 2 is reduced. This compresses the air chamber V. When the compression of the air chamber V proceeds and the pressure of the internal air rises to exceed a certain pressure, the valve structure BK opens and the air inside the air chamber V is discharged to the outside. This state is illustrated in FIG. 6B.

Figure 6B:
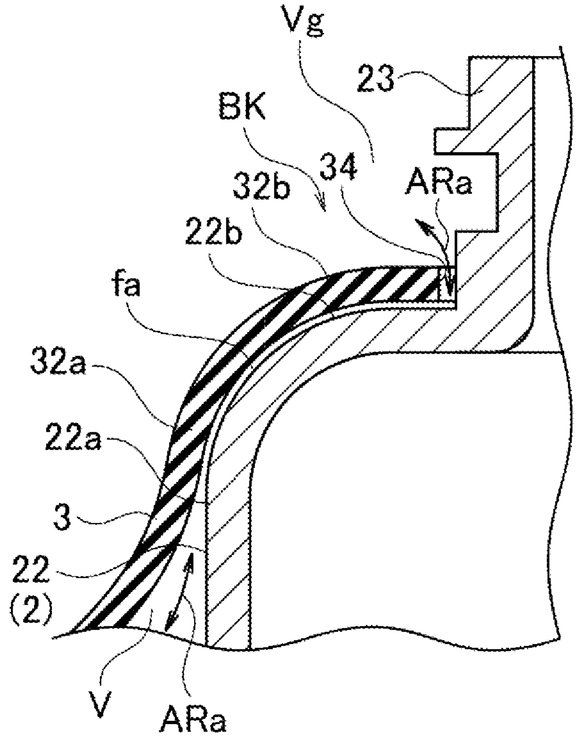
FIG. 6B is a cross-sectional view along line S6-S6 in FIG. 2, and is a longitudinal cross-sectional view of one process in mounting an earplug on an auricle.

When the internal pressure of the air chamber V rises and reaches a prescribed value, the internal pressure pushes and expands the cylindrical protrusion 32 of the cover 3 against the elastic repulsive force of the area of the cylindrical protrusion 32 and an air passage fa is formed between the cylindrical protrusion 32 and the inner housing 2 as illustrated in FIG. 6B. That is, the cylindrical protrusion 32 is expanded and deformed to form the air passage fa. The air passage fa communicates between the air chamber V and an outer space Vg through the opening 34. Accordingly, the air inside the air chamber V is discharged to the outside through the air passage fa, and the pressure inside the air chamber V falls.

Due to the earplug 91 having the valve structure BK, the load on the head is reduced when the earplug 91 is mounted on the auricle E or when the body part 911 of the earplug 91 is pressed against the conchal cavity Eb while the earplug 91 is mounted on the auricle E. More specifically, when the body part 911 is pressed against the conchal cavity Eb, the air chamber V is compressed but sealed and shrinks elastically because there is no air discharge path. In accordance with this, an elastic repulsive force of the air chamber V and the cover 3 is applied to the conchal cavity Eb, and therefore the contact feel of the body part 911 is soft and good. In this way, it is possible to enhance the wearing sensation of the body part 911 fitted in the conchal cavity Eb.

When the body part 911 is further strongly pressed against the conchal cavity Eb, the pressure in the air chamber V reaches a prescribed value, the valve structure BK opens, and the internal air of the air chamber V is gradually discharged to the outside. Therefore, the pressure inside the air chamber V is reduced. In accordance with this, the repulsive force applied to the conchal cavity Eb gradually decreases without becoming excessive in spite of the strong pressing. Therefore, the contact feel of the body part 911 is maintained in a good state. In this way, it is possible to enhance the wearing sensation of the body part 911 fitted in the conchal cavity Eb.

In a state in which the earplug 91 is mounted on the auricle E, the entire cover 3 in the circumferential direction in the valve structure BK is not uniformly in close contact with the inner wall of the auricle E. Therefore, the air passage fa is not formed in the entire circumferential direction, but first in the area where there is a gap between the cover 3 and the inner wall of the auricle E. For the discharge of the pressurized air in the air chamber V, it is sufficient if the air passage fa is formed in part in the circumferential direction.

After time has elapsed or when the earplug 91 is removed from the auricle while the air passage fa is formed, the air chamber V expands from the collapsed state by means of a restoring force that tries to return the shape of the cover 3 to the initial shape. At that time, while the deformation of the shoulder 32*b* remains, the air passage fa is maintained and air flows into the air chamber V from the opening 34. When the shape of the cover 3 returns to the original shape, the air passage fa is covered and the air chamber V becomes sealed again.

As a mode of use in which the body part 911 is pressed more strongly against the conchal cavity Eb while the earplug 91 is mounted on the auricle E, there is a mode in which the user lies on the his/her side while wearing the earplug 91, and the user's head is resting on a pillow. In this mode, the earplug 91 is pressed against the head by means of the pillow. In this mode, by the earplug 91 having the air chamber V and the valve structure BK, the body part 911 makes soft contact with the conchal cavity Eb. Accordingly, the user can have a good wearing sensation.

Embodiment 2

Figure 7A:
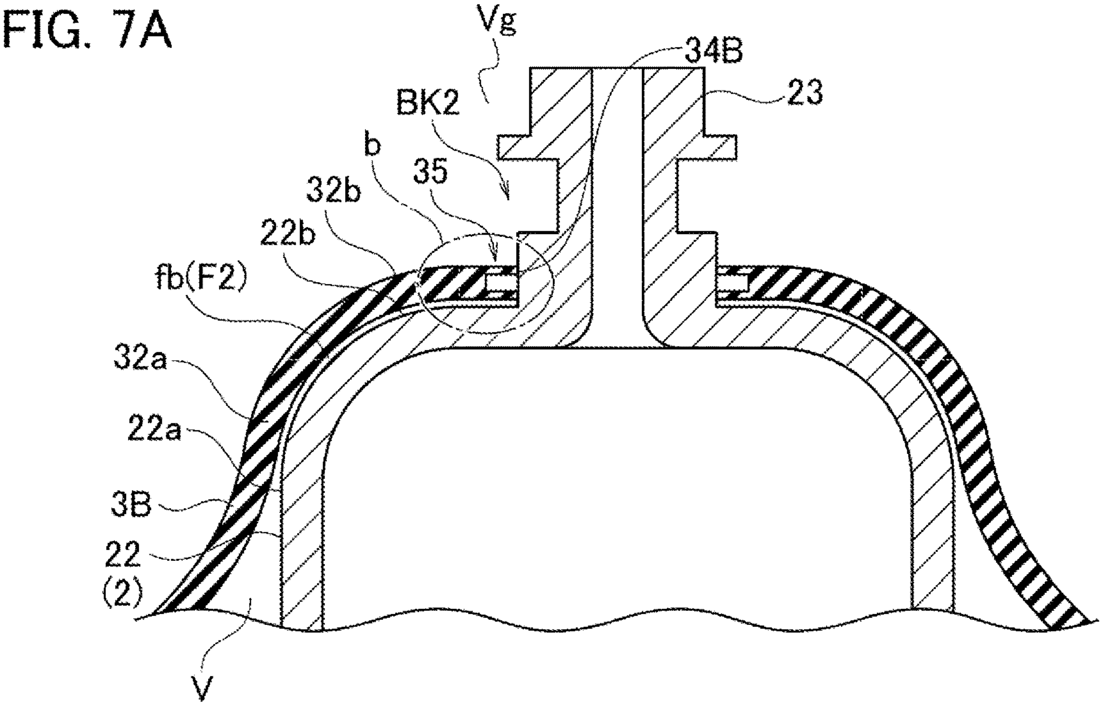
FIG. 7A is a cross-sectional view of an earplug according to Embodiment 2, and is a longitudinal cross-sectional view of when an earplug is normally mounted on an auricle.
Figure 7B:
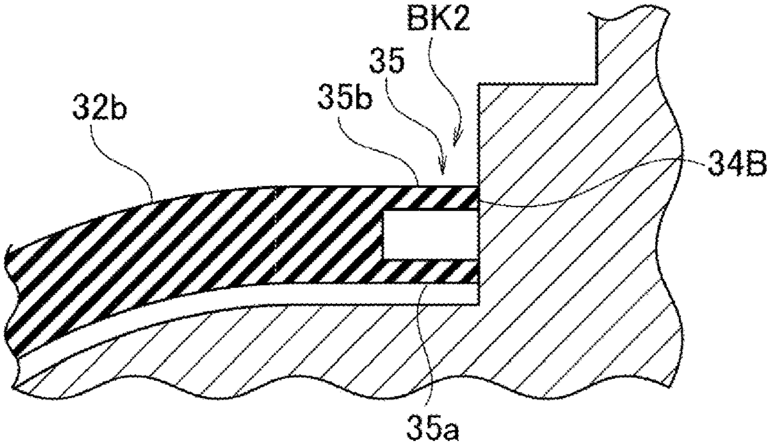
FIG. 7B is an enlarged view of part of FIG. 7A.
Figure 7C:
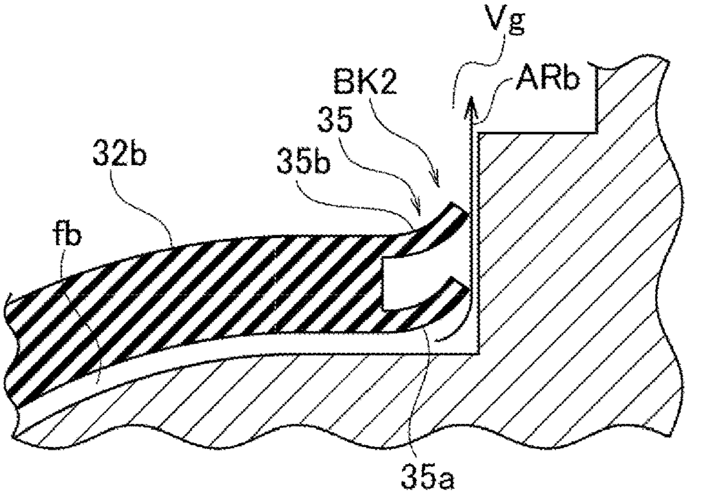
FIG. 7C is a cross-sectional view of an earplug according to Embodiment 2, and is a longitudinal cross-sectional view of one process of mounting an earplug on an auricle.

An earplug 91B according to Embodiment 2 is described. The earplug 91B is the same as the earplug 91 of Embodiment 1 except that the earplug 91B has a valve structure (a pressure regulator) BK2 instead of the valve structure BK. The valve structure BK2 is described with reference to FIGS. 7A to 7C. FIGS. 7A to 7C are cross-sectional views of the area near the shoulder 22*b* of the inner housing 2 and illustrate the valve structure BK2. FIG. 7A is a longitudinal cross-sectional view of a state in which the earplug 91B is normally mounted on the auricle E. FIG. 7B is an enlarged view of part of FIG. 7A. FIG. 7C is a longitudinal cross-sectional view of the process of mounting the earplug 91B on the auricle E.

As illustrated in FIGS. 7A and 7B, the valve structure BK2 has a cover 3B instead of the cover 3 of the valve structure BK. A side part 32*a* and a shoulder 32*b* of the cover 3B are formed so as to create a gap F2 along the whole circumference of the protrusion 22, spaced apart from the protrusion 22 of the inner housing 2 in the natural state. Accordingly, the valve structure BK2 has an air passage fb communicating with the air chamber V, between the cover 3B and the protrusion 22.

An opening 34B with an inner diameter slightly smaller than the outer diameter of the cylindrical part 23 of the inner housing 2 is formed in the shoulder 32*b* of the cover 3B. The peripheral edge of the opening 34B is a ring-shaped flap 35 that is thin and easily flexed and deformed. In the present embodiment, there are two flaps that are a thin inner flap 35*a* and outer flap 35*b* which are spaced apart in the thickness direction. The number of flaps is not limited.

By using the peripheral edge of the opening 34B including the inner flap 35*a* and the outer flap 35*b* being in close contact with the outer wall of the cylindrical part 23 in the natural state, the space on the air passage fb side is separated from the outer space Vg. When a prescribed pressure difference occurs between the space on the air passage fb side of the opening 34B and the outer space Vg, the inner flap 35*a* and the outer flap 35*b* are bent to allow ventilation in a direction that reduces the pressure difference, and a gap is formed between the inner and outer flaps 35*a*, 35*b* and the outer wall of the cylindrical part 23. This gap is not limited to a gap along the whole circumference of the outer wall of the cylindrical part 23, and may be formed in a portion in the circumferential direction.

When the earplug 91 is mounted on the auricle E, if the cover 3B is pressed against the conchal cavity Eb, the air chamber V is collapsed, and the air chamber V is pressurized, the inner flap 35*a* and the outer flap 35*b* deform such that the pressurized air in the air chamber V is discharged into the outer space Vg as an airflow ARb, as illustrated in FIG. 7C, for example.

If the earplug 91 is removed from the auricle E while the cover 3B is pressed and the air chamber V is deformed, the air chamber V of the cover 3B is expanded and decompressed from the collapsed state by means of the restoring force that tries to restore the shape to the original shape. Accordingly, the inner flap 35*a* and the outer flap 35*b* are deformed to allow air inflow from the outer space Vg to the air chamber V. When the shape of the cover 3B returns to the original shape, the difference between the pressure in the air chamber V and the pressure of the outer space Vg becomes small, the inner flap 35*a* and the outer flap 35*b* are in close contact with the cylindrical part 23 again, and the air chamber V becomes sealed again.

Due to the earplug 91B having the valve structure BK2, the load on the head is reduced when the earplug 91B is mounted on the auricle E or when the body part 911 of the earplug 91B is pressed against the conchal cavity Eb while the earplug 91B is mounted on the auricle E. Specifically, when the body part 911 is pressed against the conchal cavity Eb, the air chamber V is compressed, but until a prescribed pressure difference occurs between the air chamber V and the outer space Vg, the sealing of the air chamber V is maintained and there is no air discharge path, and therefore the air chamber V shrinks elastically. In accordance with this, an elastic repulsive force is applied to the conchal cavity Eb from the cover 3. Therefore, the contact feel is soft and good.

Suppose that the body part 911 is pressed more strongly against the conchal cavity Eb, the inside of the air chamber V is pressurized more, and a prescribed pressure difference occurs between the air chamber and the outer space Vg. In the above case, the inner flap 35*a* and the outer flap 35*b* of the valve structure BK2 are opened to discharge the internal air of the air chamber V to the outside. Therefore, the air chamber V is decompressed. In accordance with this, the repulsive force applied to the conchal cavity Eb decreases without becoming excessive despite the strong pressing of the body part 911, and a good contact feel is maintained.

There is one mode of use (lying on one's side) that has been described as an example in the description of Embodiment 1 as a mode of use in which the body part 911 is pressed more strongly against the conchal cavity Eb while the earplug 91B is mounted on the auricle E. In this case as well, due to the earplug 91B having the air chamber V and the valve structure BK2, the body part 911 comes into soft contact with the conchal cavity Eb. Accordingly, the wearing sensation is enhanced.

Embodiment 3

Figure 8A:
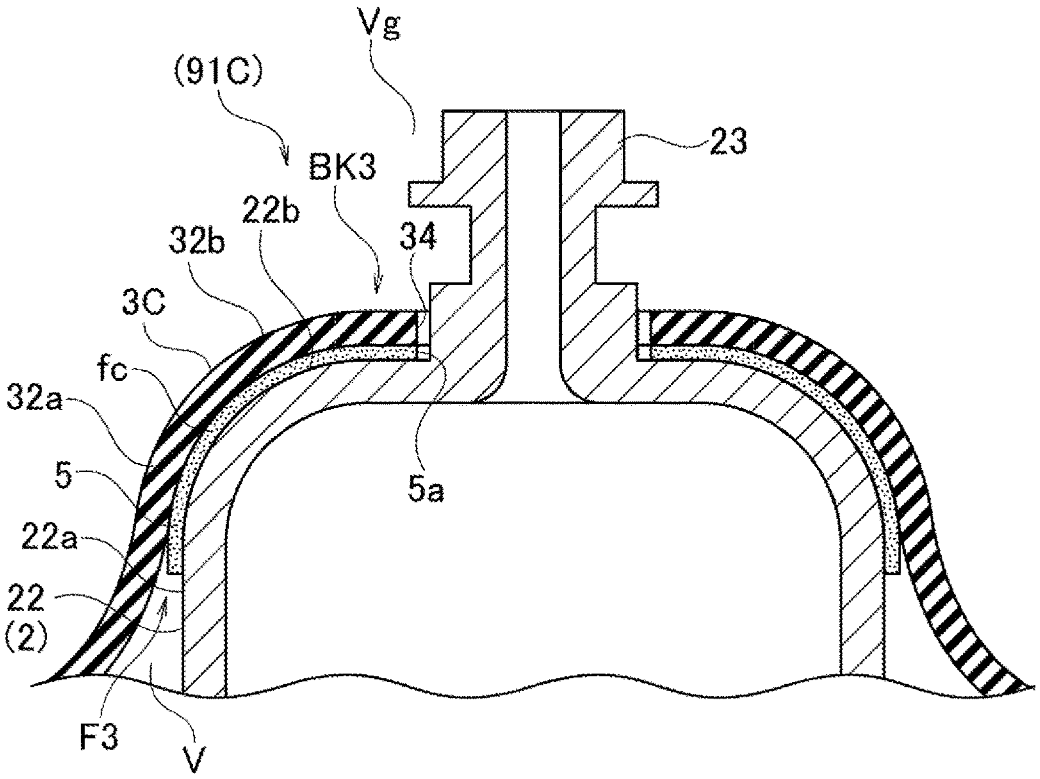
FIG. 8A is a cross-sectional view of an earplug according to Embodiment 3, and is a longitudinal cross-sectional view of when an earplug is normally mounted on an auricle.
Figure 8B:
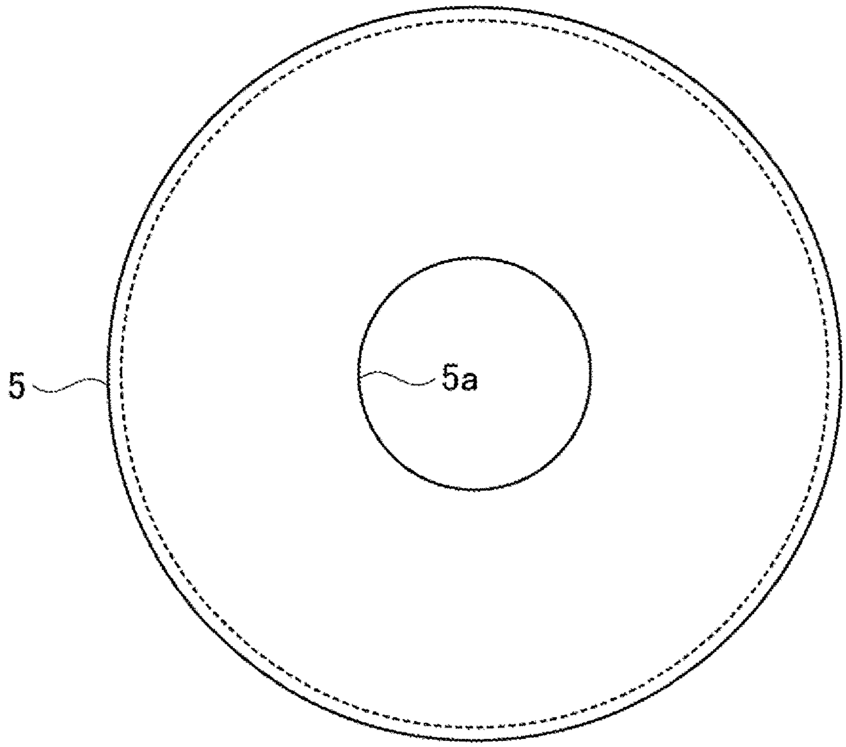
FIG. 8B is a plan view of a filter member used in a valve structure of an earplug according to Embodiment 3.

An earplug 91C according to Embodiment 3 will be described. The earplug 91C is the same as the earplug 91 according to Embodiment 1 except the earplug 91C has a valve structure (a pressure regulator) BK3 instead of the valve structure BK, and therefore the explanation of the earplug 91C is omitted. The valve structure BK3 will be described with reference to FIGS. 8A and 8B. FIG. 8A is a cross-sectional view of an area near the shoulder 22*b* of the inner housing 2 for explaining the valve structure BK3 of Embodiment 3, and is a longitudinal cross-sectional view of when the earplug is normally mounted on the auricle. FIG. 8B is a plan view of a filter member 5 used in the valve structure BK3.

As illustrated in FIG. 8A, the valve structure BK3 has a cover 3C instead of the cover 3 of the valve structure BK, and additionally has the filter member 5. The side part 32*a* and the shoulder 32*b* of the cover 3C are formed to be separated from the protrusion 22 of the inner housing 2 in the natural state. Accordingly, a gap F3 is formed between the cover 3B and the protrusion 22, and the filter member 5 is interposed in the gap F3.

As illustrated in FIG. 8B, the filter member 5 is formed in the gap F3 between the cover 3C and the protrusion 22 to have an approximate bowl shape that is in close contact with both the cover 3C and the protrusion 22. At the bottom center of the bowl-shaped filter member 5, an opening 5*a* is formed through which the cylindrical part 23 can be inserted. The filter member 5 is formed of a material through which air can pass while receiving resistance. That is, the filter member 5 is a vent resistor. Examples of such materials are porous materials such as urethane foam.

In this way, the valve structure BK3 has the filter member 5 between the air chamber V and the outer space Vg. The filter member 5 functions as an air passage fc that allows ventilation between the air chamber V and the outer space Vg with resistance. Therefore, when the earplug 91C is fitted into the conchal cavity Eb, even if the cover 3C is pressed in contact with the conchal cavity Eb and the air chamber V is compressed and deformed, the air in the air chamber V is discharged to the outer space Vg over time due to the resistance of the filter member 5. Therefore, the air chamber V shrinks gradually and elastically. As a result, an elastic repulsive force in accordance with the compressive deformation of the air chamber V is applied to the conchal cavity Eb from the cover 3. Therefore, the contact feel is soft and good.

In the valve structure BK3 of the earplug 91C, if the earplug 91C is removed from the auricle E while the cover 3C is pressed and deformed, the air chamber V expands from the collapsed state by means of the restoring force that tries to return the shape of the cover 3C to the initial shape, and the air chamber V is decompressed. As a result, outside air flows into the air chamber V through the filter member 5, and the state of the cover 3C returns to the original state.

Embodiment 4

Figure 9:
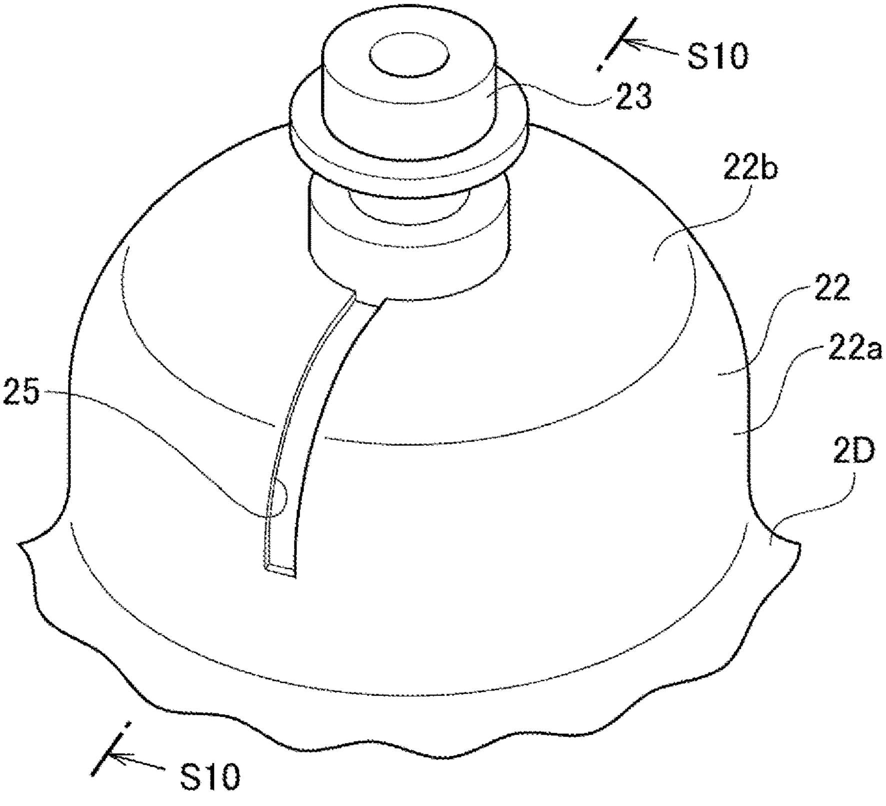
FIG. 9 is a partial perspective view illustrating an inner housing of a valve structure of an earplug according to Embodiment 4.
Figure 10:
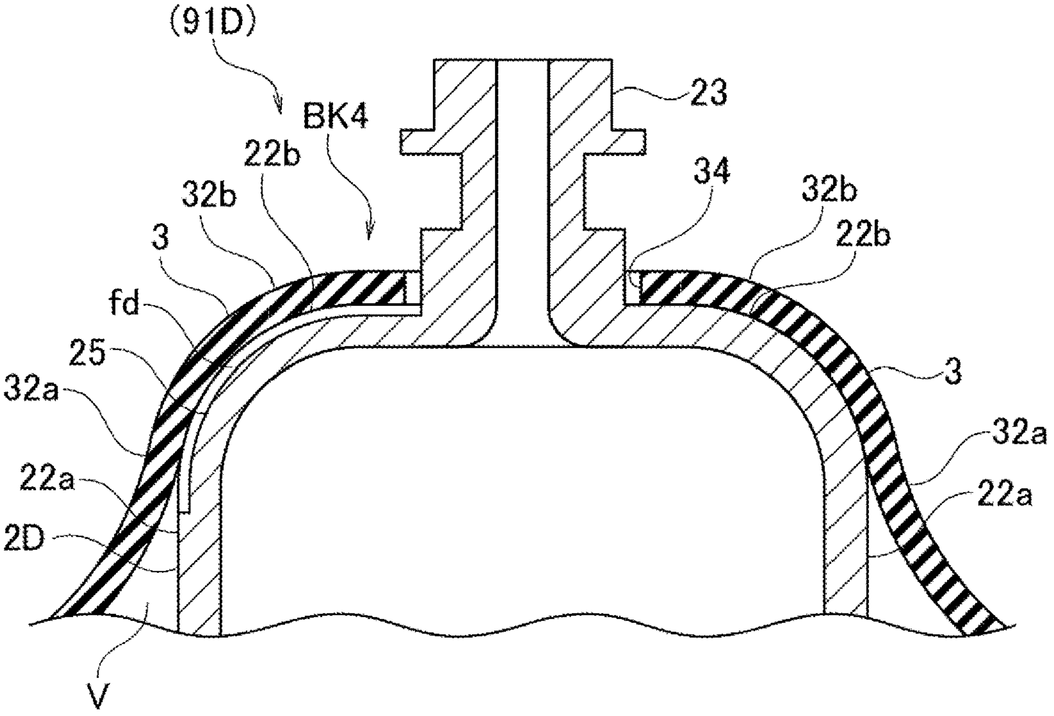
FIG. 10 is a cross-sectional view of an earplug according to Embodiment 4.

An earplug 91D according to Embodiment 4 will be described. The earplug 91D is the same as the earplug 91 according to Embodiment 1 except the earplug 91D has a valve structure (a pressure regulator) BK4 instead of the valve structure BK, and therefore the explanation of the earplug 91D is omitted. The valve structure BK4 will be described with reference to FIGS. 9 and 10. FIG. 9 is a partial perspective view illustrating an inner housing 2D of the valve structure BK4 of Embodiment 4. FIG. 10 is a cross-sectional view of the area near the shoulder 22*b* of the inner housing 2D for explaining the valve structure BK4.

The valve structure BK4 has an inner housing 2D instead of the inner housing 2 in the valve structure BK. Both structures use the cover 3. As illustrated in FIG. 9, the inner housing 2D differs from the inner housing 2 in that the inner housing 2D has a groove 25. The groove 25 is formed on the outer surface of the protrusion 22. The groove 25 extends from the base part of the cylindrical part 23 through the shoulder 22*b* of the protrusion 22 to the cylindrical part 22*a* and extends in a direction away from the opening 34 in the radial direction. The groove 25 is a narrow groove which is recessed inward from the outer surface of the protrusion 22. The cross-sectional shape of the groove 25 is not limited, but is rectangular, for example.

As illustrated in FIG. 10, the valve structure BK4 and the valve structure BK use the same cover 3. That is, the cover 3 and the protrusion 22 are in close contact with each other in the natural state at the portions where the groove 25 is present. The end of the groove 25 on the cylindrical part 22*a* side, which is the side far from the opening 34, communicates with the air chamber V in the natural state or can communicate by means of the expanded deformation of the cover 3. Meanwhile, the end of the groove 25 on the cylindrical part 23 side extends to a position visible from the outside through the opening 34 of the cover 3 and communicates with the outer space Vg. That is, the air chamber V and the outer space Vg communicate through the groove 25. The groove 25 as an air passage fd has a small cross-sectional area, and a large resistance is generated for ventilation between the air chamber V and the outer space Vg.

In this way, the valve structure BK4 has the groove 25, and the groove 25 serves as the air passage fd that allows the ventilation between the air chamber V and the outer space Vg by imparting a large resistance. Therefore, suppose that when the earplug 91D is fitted into the conchal cavity Eb, the air chamber V is compressed and deformed while the cover 3 is pressed in contact with the conchal cavity Eb. Even in the above case, the air in the air chamber V is not immediately released to the outer space Vg due to the large resistance when passing through the groove 25, the pressurized state of the air chamber V is maintained for a certain time, and the air chamber V gradually and elastically shrinks. This imparts an elastic repulsive force to the conchal cavity Eb. Therefore, the contact feel is soft and good.

In the valve structure BK4 of the earplug 91D, if the earplug 91D is removed from the auricle E while the cover 3 is pressed and deformed, the air chamber V expands from the collapsed state by means of the restoring force of the cover 3 that tries to return the shape to the initial shape, and the air chamber V is decompressed. As a result, outside air flows gradually into the air chamber V through the groove 25, and the state of the cover 3 returns to the original state.

Embodiment 5

Figure 11:
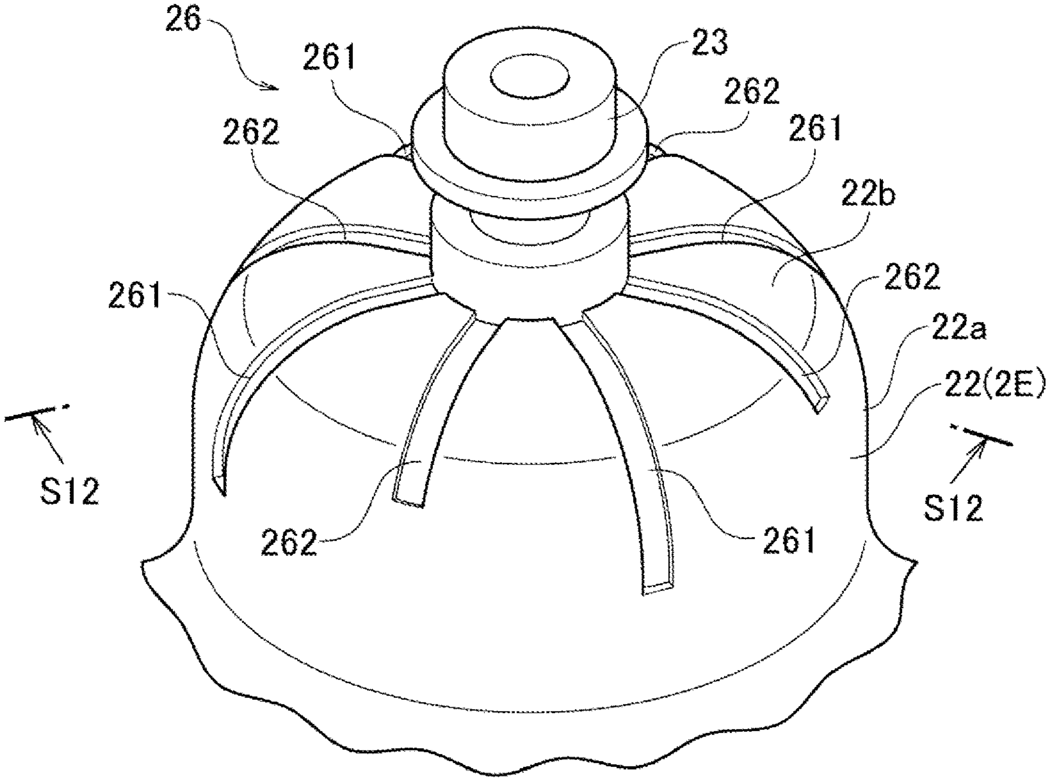
FIG. 11 is a partial perspective view of an earplug according to Embodiment 5.
Figure 12:
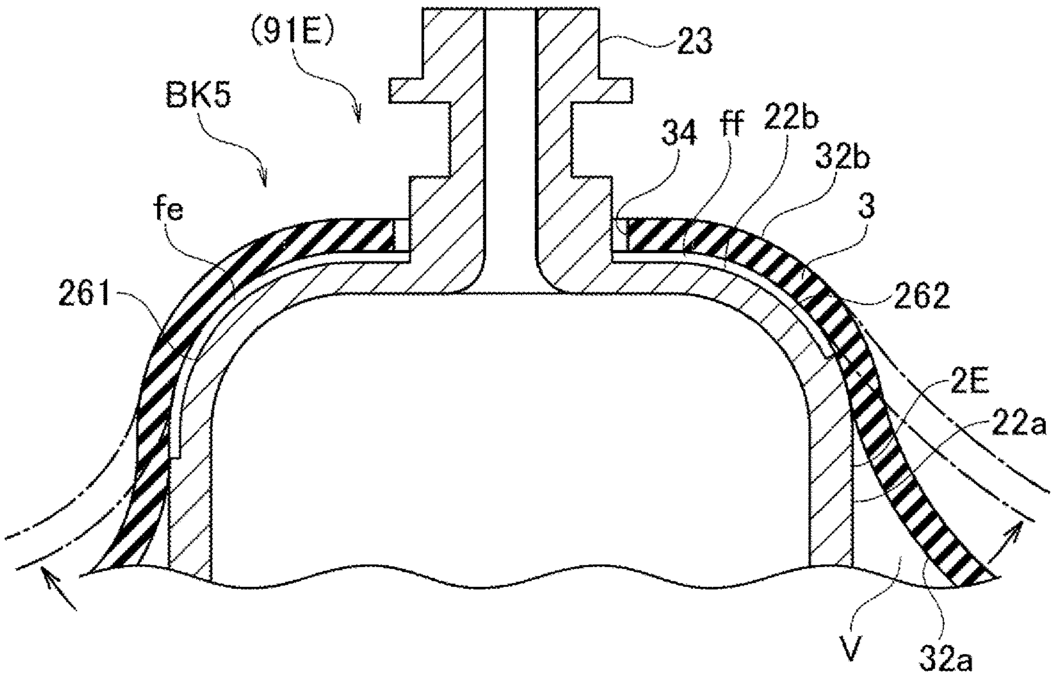
FIG. 12 is a cross-sectional view of an earplug according to Embodiment 5.

An earplug 91E according to Embodiment 5 will be described. The earplug 91E is the same as the earplug 91 of Embodiment 1 except the earplug 91E has a valve structure (a pressure regulator) BK5 instead of the valve structure BK, and therefore the explanation of the earplug 91E is omitted. The valve structure BK5 will be described with reference to FIGS. 11 and 12. FIG. 11 is a partial perspective view illustrating an inner housing 2E of the valve structure BK5. FIG. 12 is a cross-sectional view of the area near the shoulder 22*b* of the inner housing 2E for explaining the valve structure BK5.

The valve structure BK5 has the inner housing 2E instead of the inner housing 2 in the valve structure BK. As illustrated in FIG. 11, the inner housing 2E is the same as the inner housing 2 except the inner housing 2E has a plurality of grooves (groove group) 26. The groove group 26 includes long grooves 261 and short grooves 262, which are grooves of multiple types (two types in the present embodiment) with different extension lengths. In the example illustrated in FIG. 11, the groove group 26 has four long grooves 261 and four short grooves 262 formed alternately on the outer surface of the protrusion 22 of the inner housing 2E at a 45 degree pitch around the axis CL22.

The long grooves 261 extend from the base part of the cylindrical part 23 through the shoulder 22*b* of the protrusion 22 to the cylindrical part 22*a* and extend in the direction away from the opening 34 in the radial direction. The long grooves 261 are narrow grooves recessed inward from the outer surface of the protrusion 22. Meanwhile, the short grooves 262 extend from the base part of the cylindrical part 23 to the shoulder 22*b* of the protrusion and extend in the direction away from the opening 34 in the radial direction. The short grooves 262 are narrow grooves recessed inward from the outer surface of the protrusion 22. The short grooves 262 are shorter than the long grooves 261 and do not extend to reach the cylindrical part 22*a*.

As illustrated in FIG. 12, the valve structure BK5 and the valve structure BK use the same cover 3. That is, the cover 3 and the protrusion 22 are in close contact with each other in the natural state if the long grooves 261 and the short grooves 262 are absent. The distance between the end of the cover 3 on the side far from the opening 34 and the opening 34 of each long groove 261 is different from that for each short groove 262. In the natural state, the end of each long groove 261 on the side far from the cylindrical part 23 is covered with the cover 3 and does not communicate with the air chamber V. Similarly, the end of each short groove 262 on the side far from the cylindrical part 23 does not communicate with the air chamber V. That is, communication between the groove group 26 and air chamber V is regulated.

Suppose that the cover 3 is pressed in contact with the conchal cavity Eb and the air chamber V is compressed and deformed when the earplug 91E is fitted into the conchal cavity Eb. In the above case, if the degree of deformation is small, the air chamber V communicates with the long grooves 261 first. Each long groove 261 functions as an air passage fe allowing the air chamber V and the outer space Vg to communicate. The compressed air in the air chamber V is discharged to the outside through the long grooves 261 serving as the air passage fe. Since the long grooves 261 have a small cross-sectional area, a large resistance occurs for the ventilation between the air chamber V and the outer space Vg. Therefore, even if the cover 3 is deformed and the air passage fe is first established, the pressurized air in the air chamber V is not discharged from the long grooves 261 to the outer space Vg at once, but is discharged over time. Therefore, the air chamber V shrinks gradually and elastically.

Meanwhile, when the deformation of the cover 3 is large, the air chamber V communicates not only with the long grooves 261 but also with the short grooves 262. Each short groove 262 functions as an air passage ff allowing the air chamber V and the outer space Vg to communicate. Therefore, the greatly compressed air in the air chamber V due to the large collapse deformation of the cover 3 passes through the air passage fe and the air passage ff of each long groove 261 and each short groove 262 and is discharged to the outer space Vg. Thus, if the collapse deformation of the cover 3 is large, an amount of pressurized air in the air chamber V in accordance with the collapse deformation can be properly discharged. Therefore, the elastic repulsive force of the air chamber V imparted to the conchal cavity Eb by the cover 3 is not applied to the head with excessive force. That is, the elastic repulsive force of the cover 3 is stably applied to the conchal cavity Eb regardless of the amount of collapse deformation of the cover 3 which collapses in contact with the conchal cavity Eb when the earplug 91E is mounted on the auricle E. Therefore, it is possible to obtain a better wearing sensation.

An ear mount is not limited to an earplug. The ear mount may be what is referred to as an earplug type earphone or a hearing aid that houses a speaker unit inside the body part 911 and emits sound into the ear canal through the cylindrical part 23.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ear mount comprising:
- a body part mounted on a conchal cavity in a use state, the body part including
  - a protrusion,
  - a cylindrical part extending from the protrusion,
  - an inner housing on which the protrusion is formed, and
  - a cover configured to cover the inner housing; and
- an insertion part mounted on the cylindrical part and inserted into an ear canal in the use state,
- wherein the cover includes
  - a first end sealed and fixed to the inner housing,
  - an intermediate part separated from the inner housing to form an air chamber between the intermediate part and the inner housing, and configured to cover the protrusion,
  - a second end located opposite to the first end with the intermediate part therebetween, and
  - an opening located at the second end and through which the cylindrical part is inserted, and
- wherein the ear mount comprises a pressure regulator configured to control ventilation of air between the air chamber and an outer space through the opening in accordance with a pressure difference between the air chamber and the outer space.

2. The ear mount according to claim 1, wherein the pressure regulator includes the opening, the intermediate part, and the protrusion.

3. The ear mount according to claim 2, wherein
- the pressure regulator includes a gap between the opening and the cylindrical part, and
- the intermediate part is in close contact with the protrusion.

4. The ear mount according to claim 2, wherein
- the pressure regulator includes a thin flap arranged at a peripheral edge of the opening and having an inner diameter smaller than an outer diameter of the cylindrical part, and
- the flap is in close contact with the cylindrical part.

5. The ear mount according to claim 1, wherein the pressure regulator includes a vent resistor between the intermediate part and the protrusion.

6. The ear mount according to claim 1, wherein
- the intermediate part is in close contact with and covers the protrusion,
- the pressure regulator includes
  - a gap between the opening and the cylindrical part, and
  - a groove arranged in the protrusion, having one end in communication with the gap, and having the other end toward which the groove extends in a direction away from the opening, and
- the air chamber and the outer space are capable of communicating with each other via the groove.

7. The ear mount according to claim 6, wherein
- the groove includes a first groove and a second groove, and
- a separation distance between the other end of the first groove and the opening is different from a separation distance between the other end of the second groove and the opening.

* * * * *